Oct. 31, 1967   W. D. WALTHER ETAL   3,349,871
BRAKE PAD STRUCTURE
Filed July 8, 1965   2 Sheets-Sheet 1
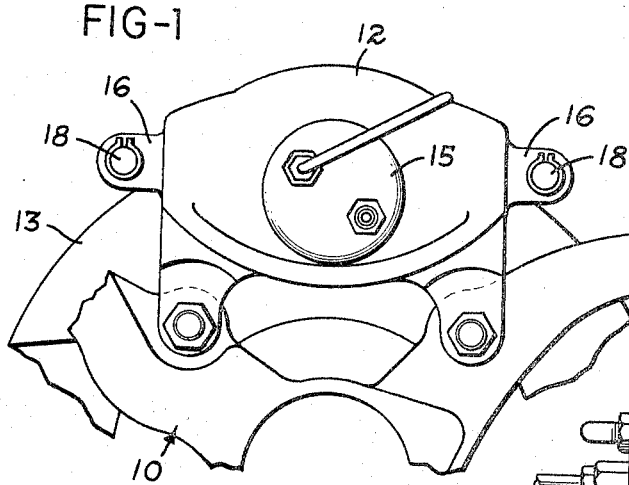
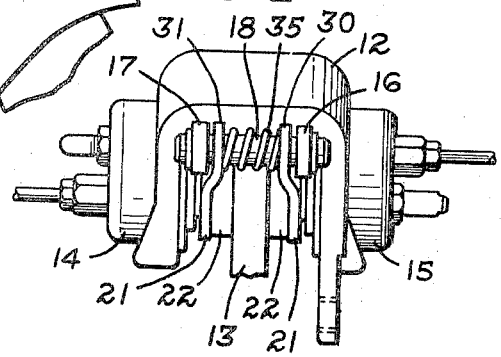
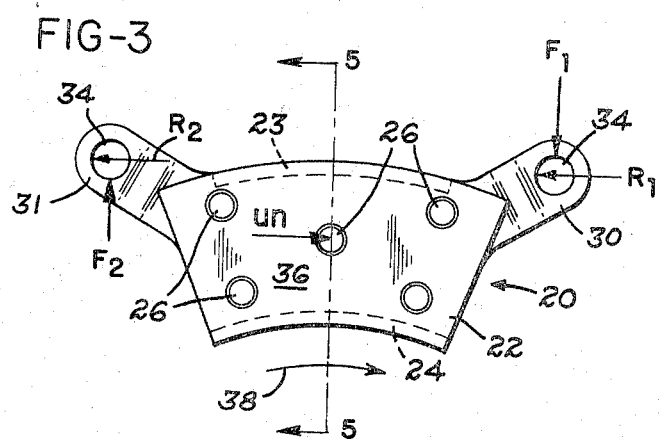
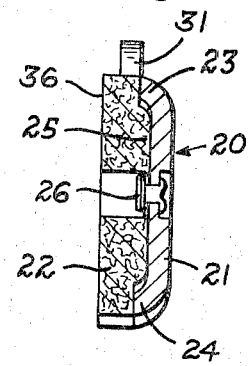
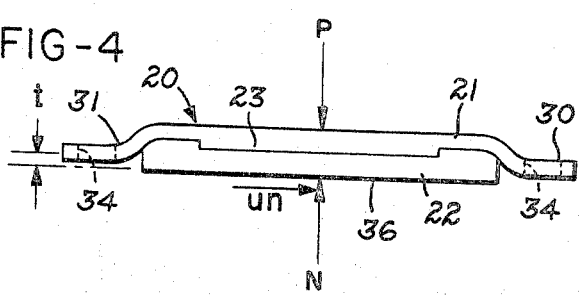
INVENTORS
WILLIAM D. WALTHER &
BY   CARLOS P. AFANADOR
*Marechal, Biebel, French & Bugg*
ATTORNEYS Oct. 31, 1967  W. D. WALTHER ETAL  3,349,871
BRAKE PAD STRUCTURE
Filed July 8, 1965 2 Sheets-Sheet 2
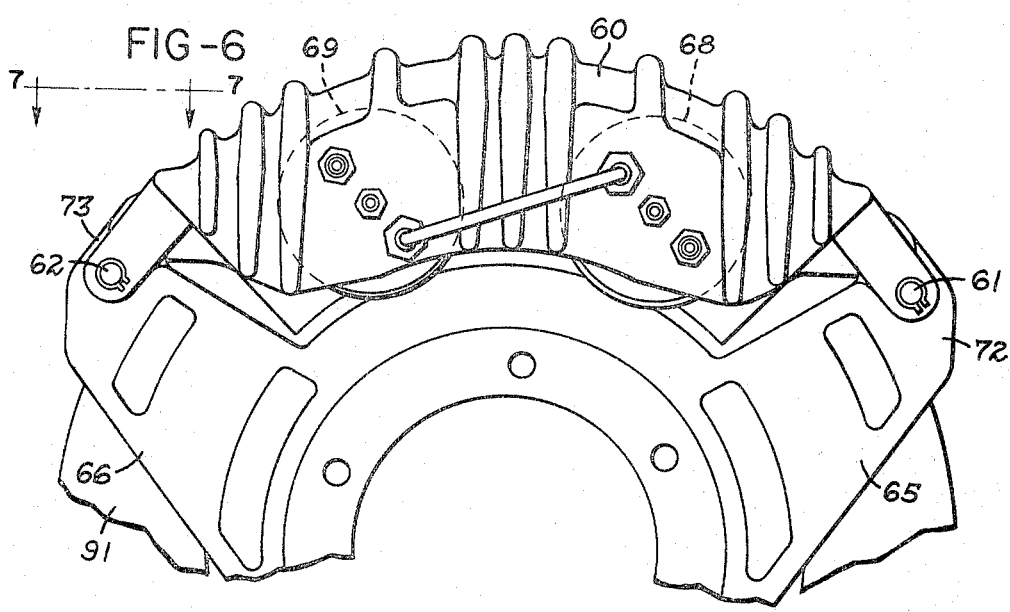
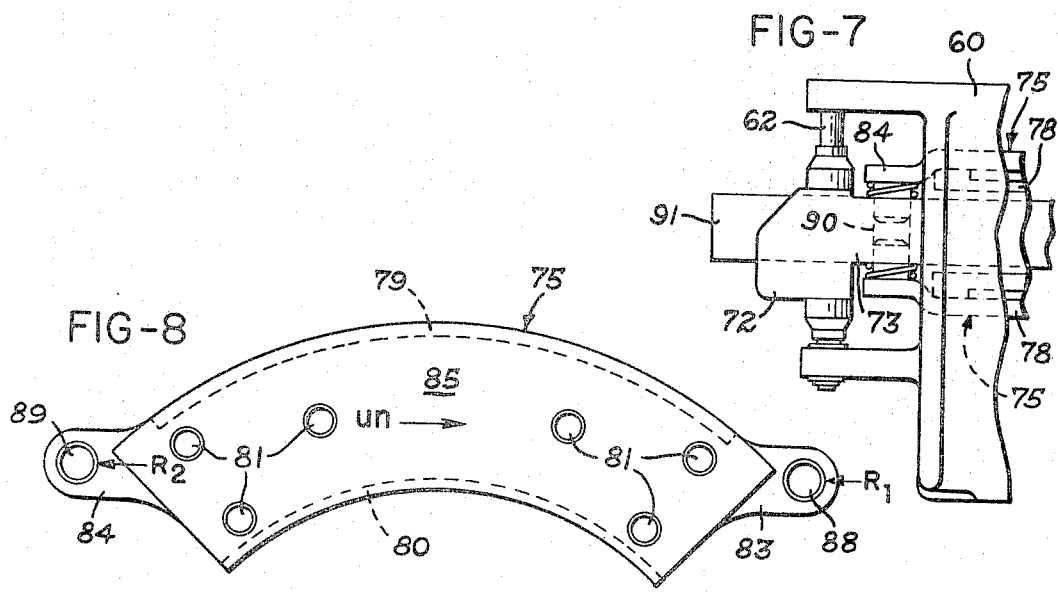
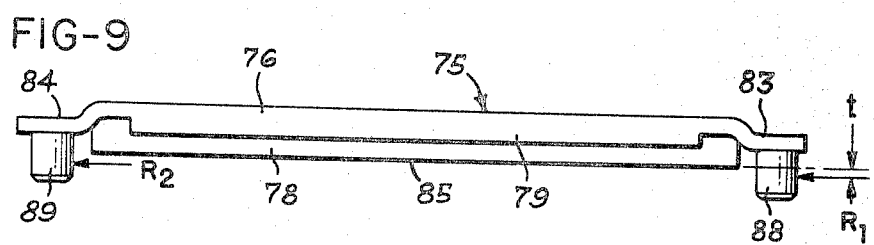

United States Patent Office 3,349,871
Patented Oct. 31, 1967

3,349,871
BRAKE PAD STRUCTURE
William D. Walther, Dayton, and Carlos P. Afanador, Centerville, Ohio, assignors to The Dayton Steel Foundry Company, Dayton, Ohio, a corporation of Ohio
Filed July 8, 1965, Ser. No. 470,448
4 Claims. (Cl. 188—73)

This invention relates to disk brakes and more particularly to improved caliper type brakes and brake pad support arrangements.

The invention has as one of its primary objects the provision of an improved disk brake and brake pad support in which uneven and non-uniform wear of the pad is reduced and the useful life extended. Uneven wear on the brake pad is often caused by unbalanced moments of forces on the pad, which cause it to wear more rapidly at some locations than at others. Such unbalanced conditions accordingly result in a corresponding decrease in the useful life of the brake lining, as compared to a disk brake in which the wear is evenly distributed across the face of the pad.

In an attempt to counteract the unbalancing moments it has been suggested that the brake applying force be offset from the geometric center of the pad. While such offset piston and force applying arrangements may reduce the uneven lining wear by physically counteracting or counterbalancing the unbalanced moments on the pad, offsetting the piston unit involves additional cost. Also, it requires careful calculations to determine the degree of unbalance present, and to determine the desired direction and amount of offset. Also, offsetting the pistons has been found to provide only limited effect in brakes which have two or more pistons on one side of the caliper.

It is therefore a primary object of the present invention to provide an improved disk brake and brake pad support in which the effect on uneven wear of the pad due to unbalancing torque is reduced to a negligible amount, or a controlled wear with an even wear result in the completely worn condition.

A further object of this invention is to provide, in a caliper type brake, brake pad supporting arrangements in which the points of torque-transmitting connection between a backing plate and a fixed torque member lie along a line which is closely adjacent to the plane including the friction surface of the brake pad, so as to reduce to a minor or negligible amount the coupling moment between the surface of the pad which is acted upon by the disk and the torque members, thereby substantially reducing or eliminating uneven or tapered wearing of the pad caused by unbalanced moments.

An advantage of the present invention is that by providing an offset pad support which lies adjacent the surface of the pad, the moments which effect taper may be reversed during the wear of the pad so that, accumulatively, the total wear on the pad is substantially uniform.

Another object of this invention is to provide an improved brake pad and supporting plate arrangement in which the plate is formed with supporting ribs which strengthen the plate, and which further provide an arrangement by which the pad may be keyed into place.

A still further object of this invention is the provision of an improved brake pad and supporting plate for disk brakes in which the plate is curved in section providing a recess within which the rivets may be recessed, and further providing a recessed thickness of lining which acts as insulation or a heat barrier.

These and other objects and advantages of the present invention will become apparent from the following description, the accompanying drawings and the appended claims.

In the drawings:

FIG. 1 is a front elevational view of a fixed, opposed-piston caliper disk brake incorporating this invention;

FIG. 2 is a side elevation of the brake of FIG. 1;

FIG. 3 is a front elevational view of the brake pad and supporting plate used in the brake of FIGS. 1-2;

FIG. 4 is a top plan view of the brake pad and plate of FIG. 3;

FIG. 5 is a vertical section through the pad and plate taken generally along the lines 5—5 of FIG. 3;

FIG. 6 is a front elevation of a floating caliper type of disk brake to which the invention is applied;

FIG. 7 is a fragmentary plan view of a portion of the brake of FIG. 6 looking generally along the line 7—7 of FIG. 6;

FIG. 8 is a front elevation of one of the brake pads and supporting plates used in the brake of FIGS. 6–7; and FIG. 9 is a top plan view of the brake pad and plate of FIG. 8.

Referring to the figures of the drawings which illustrate preferred embodiments of the invention, a fixed caliper disk brake as shown in FIG. 1 as including a fixed or rigid axle or frame member 10 upon which a caliper housing 12 is mounted in straddling relation to the periphery of a disk 13. The brake shown in FIGS. 1 and 2 may be of the opposed-piston type and accordingly includes a pair of opposed piston units 14 and 15 fixably mounted in the caliper housing 12 at opposite sides of the disk 13.

The housing 12 further has pad supports in the form of integral, outwardly-extending tabs or ears 16 and 17 formed in aligned, spaced-apart pairs on each side of the housing 12. The ears 16 and 17 extend to positions beyond the periphery of the disk 13, with each of the ears being provided with a suitable axially aligned opening to receive a removable brake plate supporting pin 18. The integral tabs or ears 16 and 17, and the pair of pins 18, which are removably supported transversely therebetween, comprise fixed torque means for supporting the pads of friction material for translatory movement into and out of engagement with the disk, and for receiving the torque which is transmitted from the braking pad to the fixed axle or frame member 10.

The brake of FIGS. 1 and 2 also includes a pair of friction pad units, as shown generally at 20 in FIGS. 3 and 4, with one of the units 20 being positioned in the caliper housing 12 on each side of the disk 13. The friction pad units 20 may be formed identically to each other, and each have a metal backing plate 21 which supports a pad of friction material 22. The backing plate 21 is formed with a central pad-supporting portion which is arcuately straight but curved or cup-like in transverse section forming inwardly-turned, radially spaced, arcuately extending ribs 23 and 24, as shown in section in FIG. 5. A lower or inner rib 24 may extend the full width of the pad segment, but the outer rib 23 preferably has an arcuate length which is less than that of the pad 22, and forms a key-like projection which is received within a cooperating arcuate recess formed in the pad 22.

The ribs strengthen the plate against deflection while the curved configuration provides, in effect, a shallow recess 25 between the ribs 23 and 24 which serves to receive the heads of the pad supporting rivets 26, as shown in FIG. 5. In addition, the recess 25 provides a thickness of lining which acts as a heat bearer or insulation which, in effect, serves to isolate the plate 21 and adjacent hydraulic pistons from the heat generated at the braking face of the pad 22.

The backing plate 21 is also of particular advantage when used with linings 22 which are bonded to the backing plate. The key formed between the outer rib 23 and the conforming slot or recess in the back of the friction pad 22 give additional support for the pad of lining material. Accordingly, the backing 21 provides a shallow receptacle for a portion of the pad, while the radial extent of the pad 22 is coterminous with the radial dimensions of the ribs 23 and 24.

The plate 21 further has torque member engaging means comprising outwardly and laterally diverging portions 30 and 31 which extend integrally from the backing plate 21. The portions include outer or terminal ends which are provided with openings 34, as shown in FIG. 3, which are received in sliding relation on the pins 18. As shown in FIG. 2, coiled retraction springs 35 may also be threaded on the pins 18 in compression between the ends of the opposite plates 21, to urge the same away from the disk 13.

FIGS. 3 and 4 also illustrate some of the more important forces which act upon the pad and backing plate units 20 during the time that the brakes are applied. The force of the hydraulic piston unit is shown as being applied at P at the center of the back side of the plate 21. An equal and opposite force N represents the reaction force between the disk 13 and the planar face 36 of the pad 22. The torque on the pad 22 is the product of N times the coefficient of friction $\mu$, and is shown as being applied normal to the face of the pad 22 from left to right, assuming a clockwise direction of disk rotation as shown by the arrow 38 in FIG. 3.

The torque is submitted through the pad 22 to the backing plate 21, and through the integral extensions 30 and 31 to the torque-receiving pins 18 on the caliper housing 12. The reaction forces on the backing plate at the pins 18 are shown by the arrow $R_1$ at the extension 30 and the arrow $R_2$ at the extension 31. In addition, since the pad 22 engages an arcuate face of the disk 13, a rotational force imparted to the pad, and the reaction force at the pins 18 is shown by the vectors $F_1$ at the extension 30 and $F_2$ at the extension 31.

When the moments are summed about the center of the pad at the face 36 there is an unbalanced moment ($R_1$ and $R_2$) times the transverse distance to the support which excites tapered wear. This unbalance in the moments results in the material at the trailing edge of the pad wearing at a greater rate than the leading edge of the pad.

The present invention substantially reduces the effects of the unbalanced moments by providing a backing plate 21 which forms a sliding torque-transmitting connection with the torque member at spaced points or regions which lie substantially close to the plane including the face 36 of the pad 22, so as to reduce the unbalancing moment arm $t$ to a negligible amount. This is accomplished by offsetting the end portions or extensions 30 and 31 of the backing plate 21 forwardly or inwardly toward the disk and toward the working face 36 of the pad 22 which engages the disk.

Preferably, the offset portions 30 and 31 are spaced a distance $t$ from the face 36 of the pad which distance becomes progressively smaller as the pad wears until the distance is zero. With further wear, the absolute value of the distance $t$ reverses. Accordingly, in the embodiment shown in FIGS. 3 and 4, the points of support defined by the offset portions form torque transmitting connections which lie along a line which is substantially midway between the face and the back of the pad 22, when viewed from the top as in FIG. 4. With this arrangement, the slight unbalanced wear which occurs during the initial use of the pad is compensated for by a slight unbalance in the opposite direction during the terminal use of the pad, prior to replacement of the pad. Tapered wear is accordingly substantially eliminated by providing a coupling moment which remains negligible throughout the life of the lining.

A further embodiment of the invention is shown in FIGS. 6–9 as being applied to a floating caliper brake similar to the type shown in U.S. Patent No. 3,081,843, assigned to the same assignee as this application. The brake illustrated in FIGS. 6 and 7 is of the floating caliper type in which a caliper housing 60 is mounted for transverse aligning movement on pins 61 and 62 which are carried in the ends of outwardly extending, fixed torque arms 65 and 66. The caliper housing 60 may include a pair of hydraulic force applying units 68 and 69 positioned in one side thereof, with the reaction force being applied through the caliper by transverse alignment on the arms 65 and 66.

The outer ends 72 of the arms 65 and 66 extend beyond the periphery of the disk 67 and turn axially so that they overlie the periphery of the disk. Further, the ends 72 each have arcuately extending portions 73 which turn inwardly toward each other and toward the caliper housing 60, and provide the torque-receiving means by which the pads of friction material are supported.

The combined pad and plate units are shown at 75 in FIGS. 8 and 9 and include a generally arcuately-shaped backing plate 76 supporting a pad 78 of frictional material on one face thereof. The plate 76 may be configured similarly to the plate 21, defined above, to include the radially-spaced arcuate ribs 79 and 80. The friction material 78 may be similarly configured to be received within the recess formed between the ribs 79 and 80. Also, the rib 79 is shown as having an arcuate length which is less than the length of the pad 78, and is received within a cooperating slot portion formed in the pad for keying the pad 78 in position with the backing plate 76. Also, the heads of the rivets 81 are received wholly within the dimensions of the recess formed between the ribs so as to be protected thereby from contact with the disk as the pad wears.

The plate 76 is formed with opposite integral extensions 83 and 84 which are offset slightly forwardly toward the face 85 of the pad 78. The ends of the extensions rigidly support stub pins 88 and 89 which form sliding, spaced apart connections within suitable transversely-aligned openings 90 formed in the arm extensions 73. Accordingly, the pins 88 and 89 provide spaced apart torque-transmitting connections with the torque members or arms 65 and 66.

As shown in FIGS. 7 and 9, the connections formed between the pins 88 and 89 and the arm extensions 83 and 84 along a line, as indicated by the arrows $R_1$ and $R_2$, which is closely adjacent the face 85 of the pad 78 when the pad 78 engages the disk 91. A particular advantage of the embodiment shown in FIGS. 6–9 is that as the pad wears, and the plate 76 progressively moves toward the disk, the relationship $t$ between the working surface 85 of the friction pad and the effective torque-transmitting connections at the pins 88 and 89 remains relatively constant. As a result, the effective coupling moment $t$ ($R_1$ and $R_2$) remains at a minimum and a negligible amount through the life of the lining.

It will therefore be seen that this invention provides an improved disk brake and brake pad supporting arrangements which are characterized by long life and uniform wear. The radially curved configuration of the backing plates 21 and 76 provide a pad support of exceptional strength while securely locking and keying the pads and providing a recessed portion of material which serves as additional heat insulation.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. In a disk brake, an improved brake pad supporting arrangement comprising a torque member, a backing plate, means on said backing plate supporting a pad of friction material, said pad having a face surface engageable with the disk and a back supported on said plate spaced from said face surface, means on said backing plate forming a pair of supports which are offset forwardly in a direction toward the face of said pad and which form spaced apart sliding torque transmitting connections with said torque member which connections lie along a line which is substantially midway between the face and the back of said pad providing a moment arm between the brake force applied to said pad at said braking surface and the reaction force applied to said plate at said spaced torque transmitting connections which progressively decreases toward zero and then increases as said pad wears.

2. The brake of claim 1 wherein said torque member includes a pair of spaced-apart pins, and said sliding torque transmitting connections comprise means in each said backing plate supports defining an opening slidably receiving one of said pins therein.

3. In a caliper type disk brake, the improvement in friction pad supporting arrangement comprising a pair of fixed torque arms having spaced apart end portions which overlie a peripheral portion of the disk, means in each of said end portions defining a pin-receiving opening, a pair of backing plates each supporting a pad of friction material thereon having a braking surface, means on each of said backing plates engageable with said torque members including arcuately spaced stub pins extending from the associated said plate and terminating at locations forwardly of said backing surfaces, there being one pin on each said plate for each of said torque member openings slidably received within said openings supporting its associated said pad for translatory movement out of and into engagement with a disk, said pins and said torque member portions forming spaced apart regions of torque-transmitting contact which regions lie closely adjacent to a plane including said pad braking surface when it is in engagement with the disk providing a minimum moment arm between the braking force applied by the disk at said pad surface and the reaction force applied to said plate at said torque arm portions.

4. In a caliper type disk brake in which a plate supports a pad of friction material along a back surface of such pad and is formed with extensions for slidably mounting on brake torque-receiving members, the improvement in such pad supporting plate comprising stub pins mounted on said plate and extending from said plate forwardly toward a face of such pad engaging said disk and terminating at locations closely adjacent to a plane including such pad face and adapted to be slidably mounted on said torque receiving members and engaging said members at locations closely adjacent to said plane resulting in a minimum coupling arm between the face of said pad and the locations of engagement with said torque-receiving member.

References Cited

UNITED STATES PATENTS

| | | | |
|---|---|---|---|
| Re. 25,817 | 7/1965 | Butler | 188—73 |
| 995,344 | 6/1911 | Goodwin | 188—250 X |
| 1,559,146 | 10/1925 | Andrews | 188—250 |
| 2,951,561 | 9/1960 | Davis | 188—73 |
| 2,963,116 | 12/1960 | Peras | 188—73 |
| 3,081,843 | 3/1963 | Dotto et al. | 188—73 |
| 3,119,468 | 1/1964 | Mossey | 188—73 |
| 3,251,436 | 5/1966 | Afanador et al. | 188—73 |
| 3,275,105 | 9/1966 | Petit | 188—250 |

FOREIGN PATENTS 1,340,988  9/1963  France.

MILTON BUCHLER, *Primary Examiner.*

G. E. HALVOSA, *Assistant Examiner.*